(12) United States Patent
Hou et al.

(10) Patent No.: US 8,434,369 B2
(45) Date of Patent: May 7, 2013

(54) PRELOADED PRESSURE SENSOR MODULE

(75) Inventors: Chih-Sheng Hou, Taipei (TW);
Yann-Cherng Chern, Taipei (TW)

(73) Assignee: Universal Cement Corporation (TW)

( * ) Notice: Subject to any disclaimer, the term of this patent is extended or adjusted under 35 U.S.C. 154(b) by 170 days.

(21) Appl. No.: 13/113,426

(22) Filed: May 23, 2011

(65) Prior Publication Data
US 2012/0297885 A1    Nov. 29, 2012

(51) Int. Cl.
*G01L 9/12* (2006.01)
*G01L 9/06* (2006.01)
*G01L 13/02* (2006.01)
*H02B 1/00* (2006.01)

(52) U.S. Cl.
USPC ............... 73/718; 73/724; 73/721; 73/727; 361/600

(58) Field of Classification Search ............ 73/700–756
See application file for complete search history.

(56) References Cited

U.S. PATENT DOCUMENTS

| | | | | |
|---|---|---|---|---|
| 4,864,874 A * | 9/1989 | Hafner | ...................... | 73/862.382 |
| 4,972,717 A * | 11/1990 | Southworth et al. | ............ | 73/724 |
| 5,044,202 A * | 9/1991 | Southworth et al. | ............ | 73/724 |
| 5,060,520 A * | 10/1991 | Strasser | .......................... | 73/715 |
| 5,149,121 A * | 9/1992 | Hafner | .......................... | 280/432 |
| 6,279,395 B1 * | 8/2001 | Insalaco et al. | ............ | 73/514.34 |
| 2008/0257055 A1 * | 10/2008 | Giordano | ........................ | 73/722 |
| 2010/0050777 A1 * | 3/2010 | Zheng et al. | ..................... | 73/727 |
| 2010/0257938 A1 * | 10/2010 | Kurtz et al. | ..................... | 73/727 |
| 2011/0126634 A1 * | 6/2011 | Kurtz et al. | ..................... | 73/727 |

* cited by examiner

*Primary Examiner* — Andre Allen
(74) *Attorney, Agent, or Firm* — Lowe Hauptman Ham & Berner, LLP

(57) ABSTRACT

A preloaded pressure sensor module (PPSM) is disclosed, where the PPSM outputs a linear Conductivity Response versus Pressure Force input. The PPSM has a convex or concave profile which is prepared by pressing a flat pressure sensor device onto to a convex or concave base respectively so that the pressure sensitive layer inside the sensor module is bent and displays a preloaded effect.

31 Claims, 27 Drawing Sheets

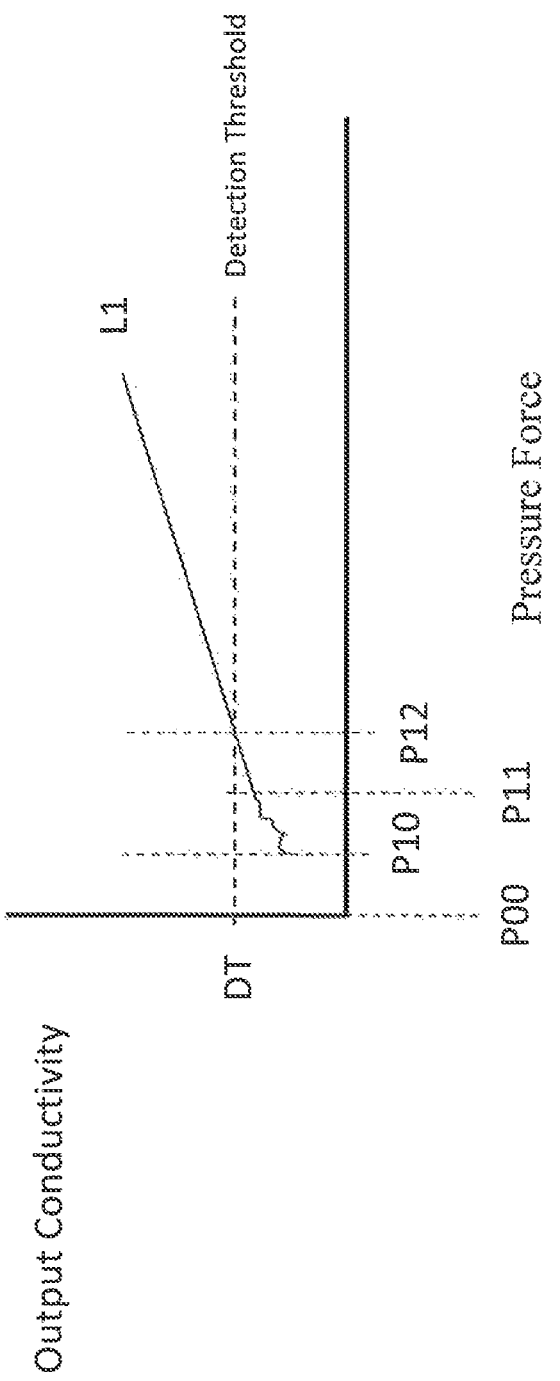

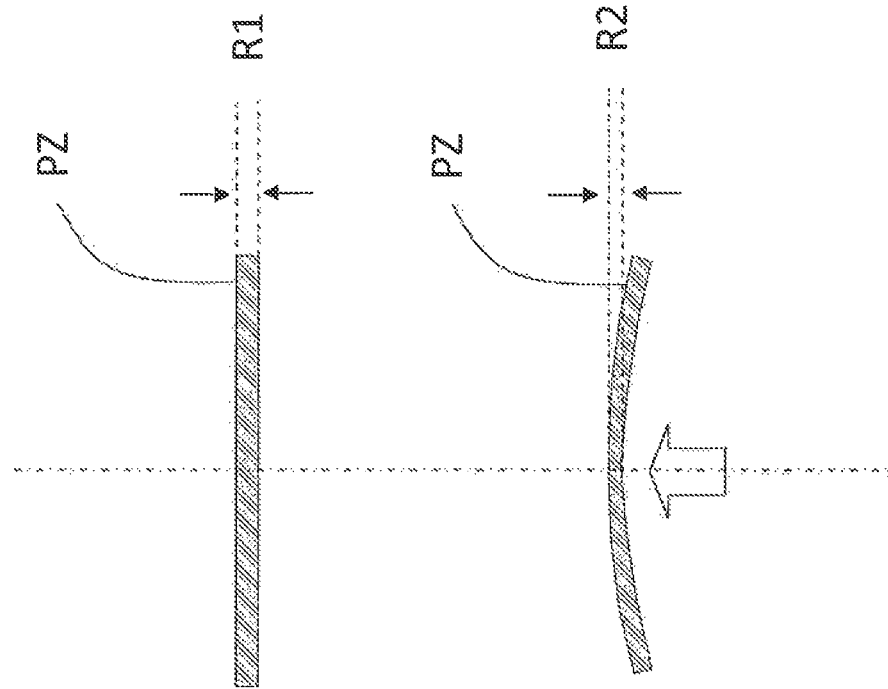

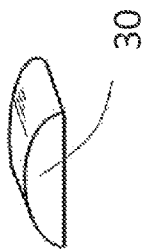
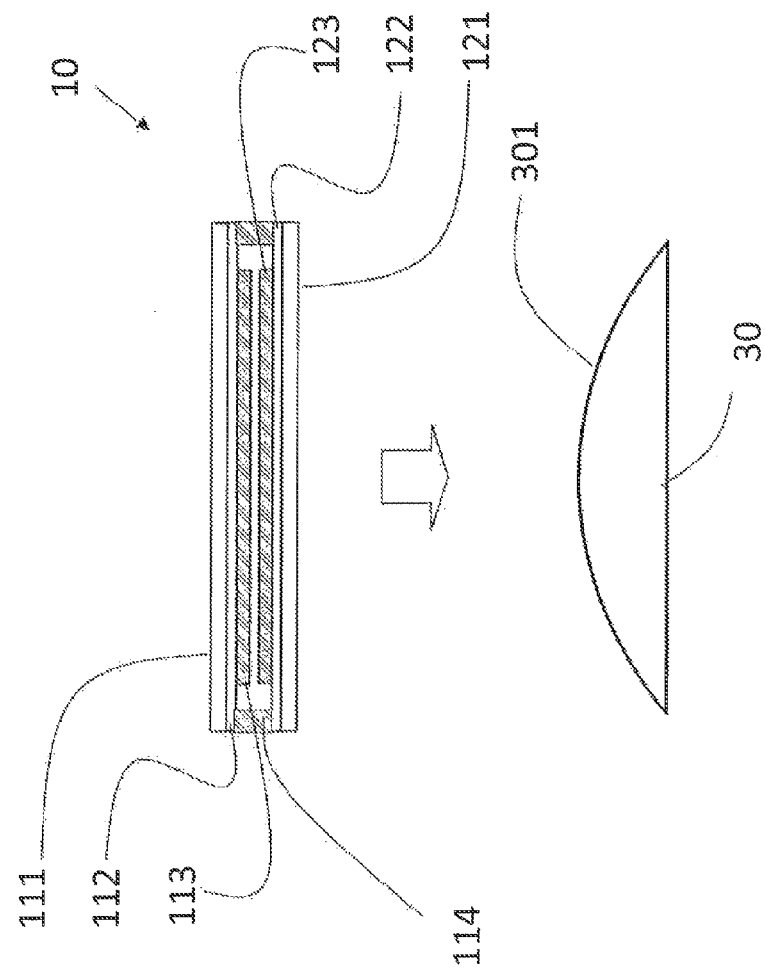

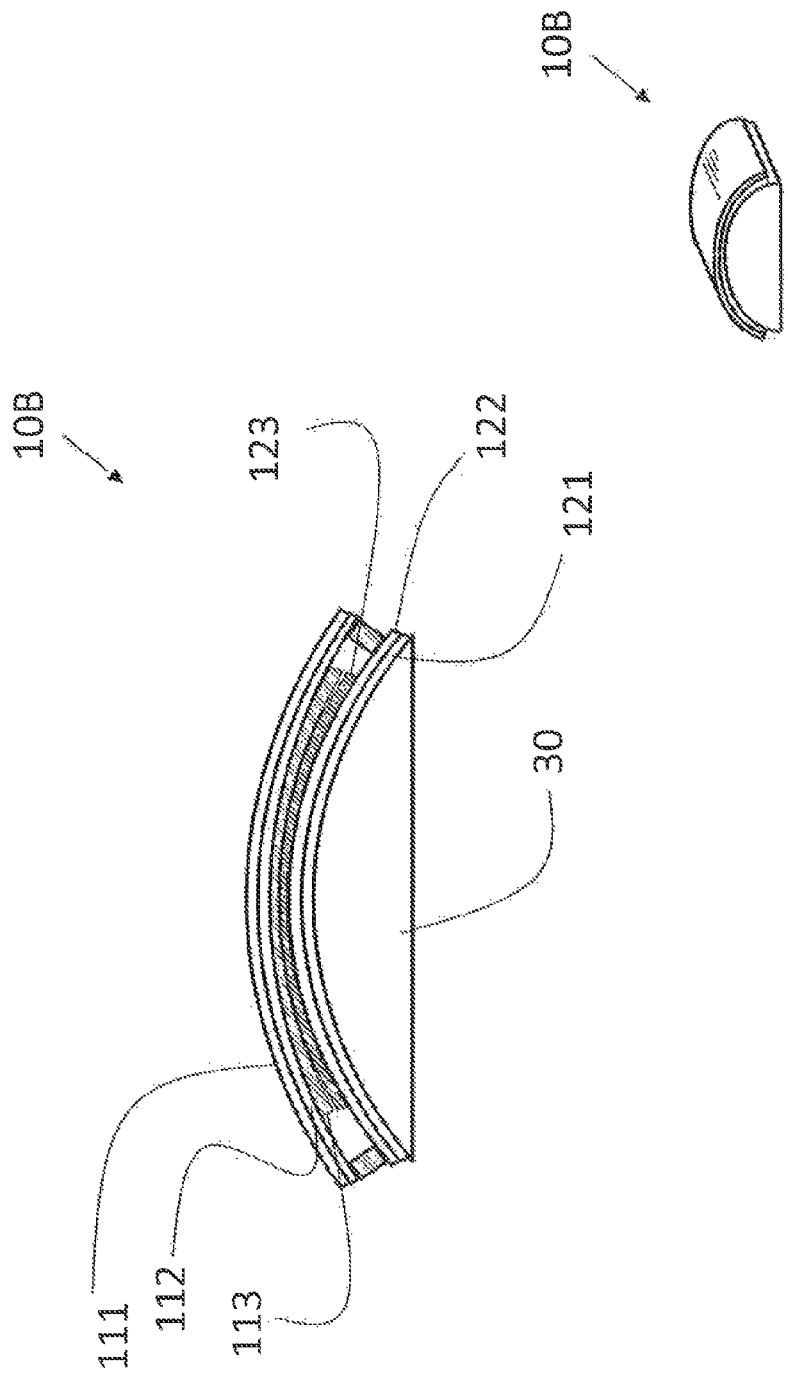

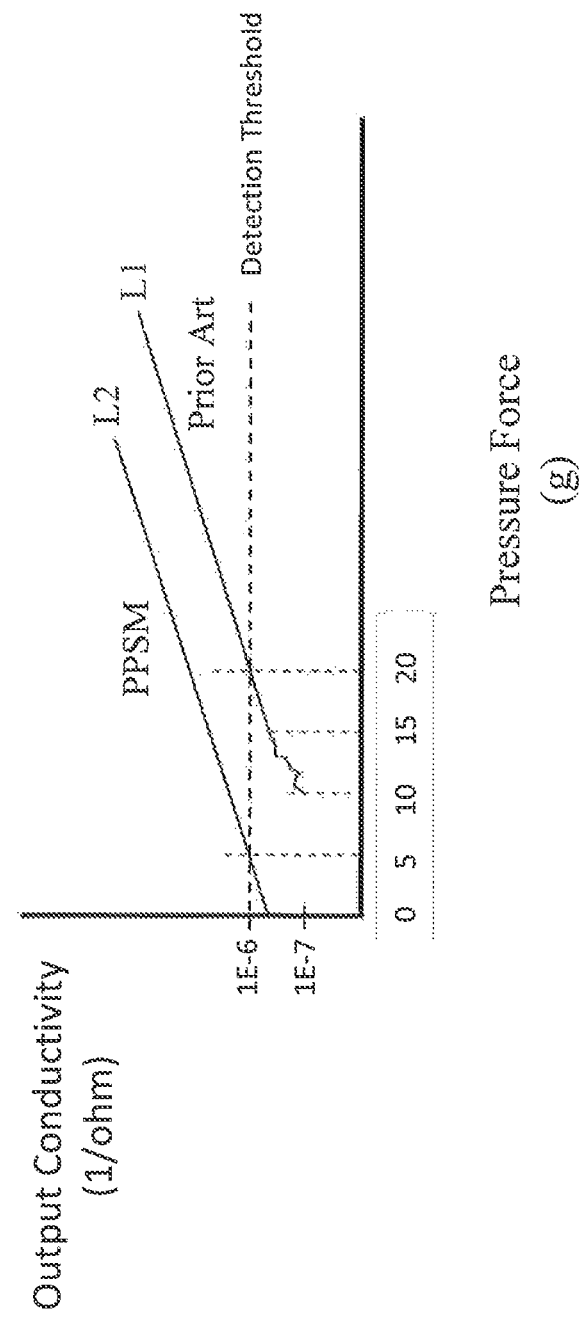

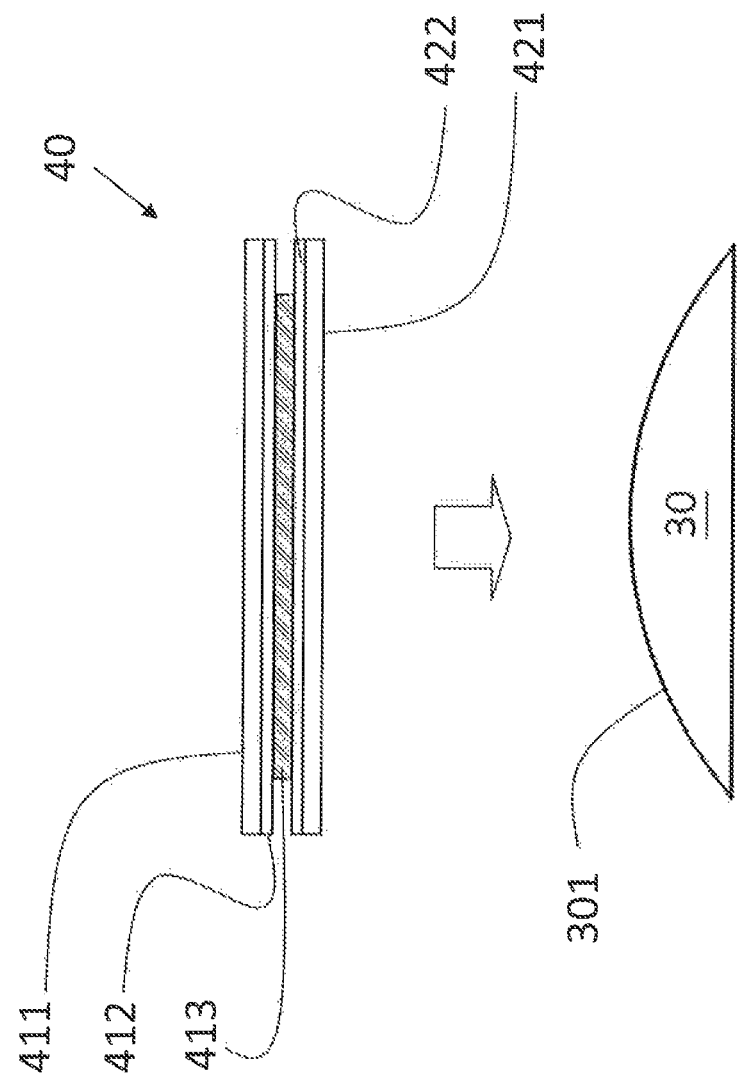

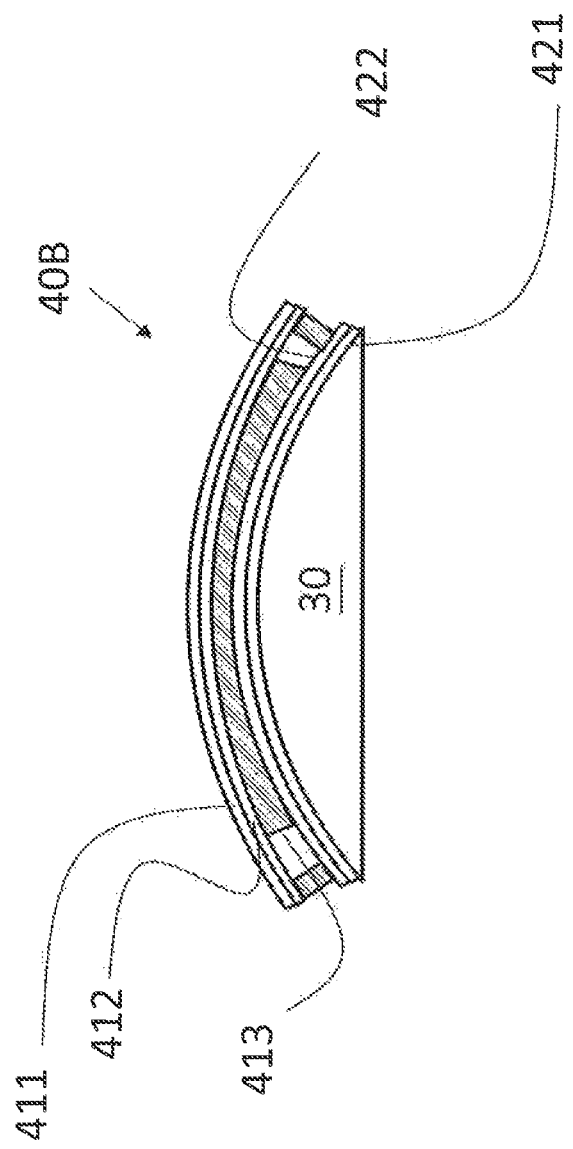

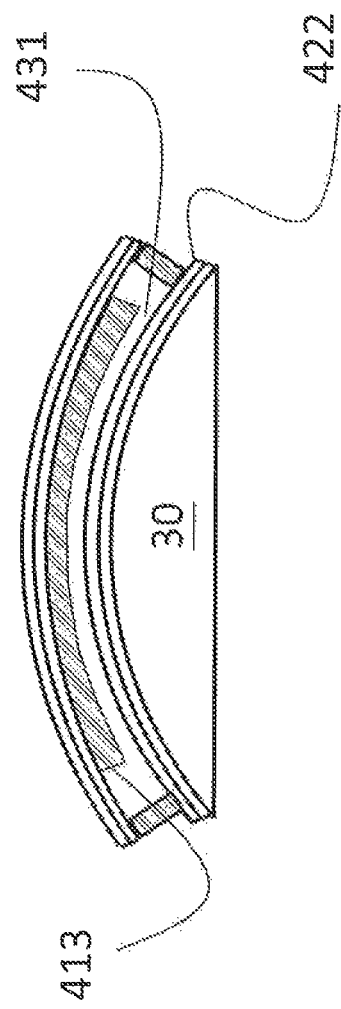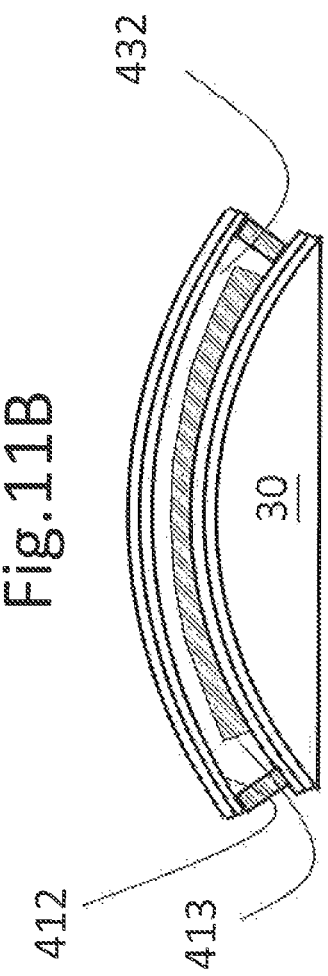

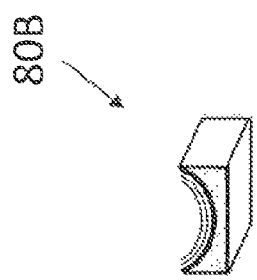
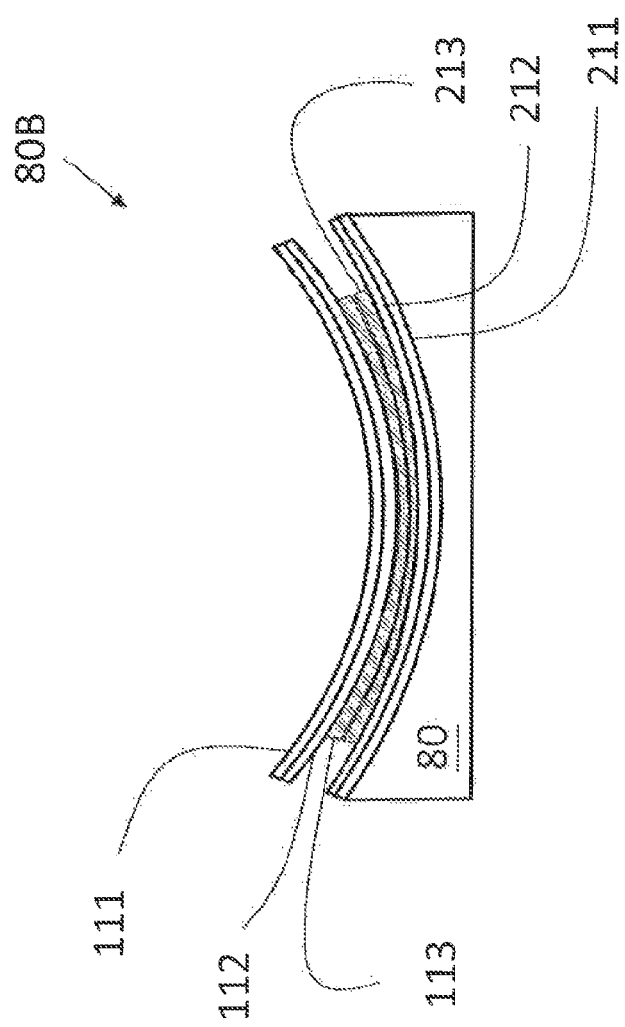

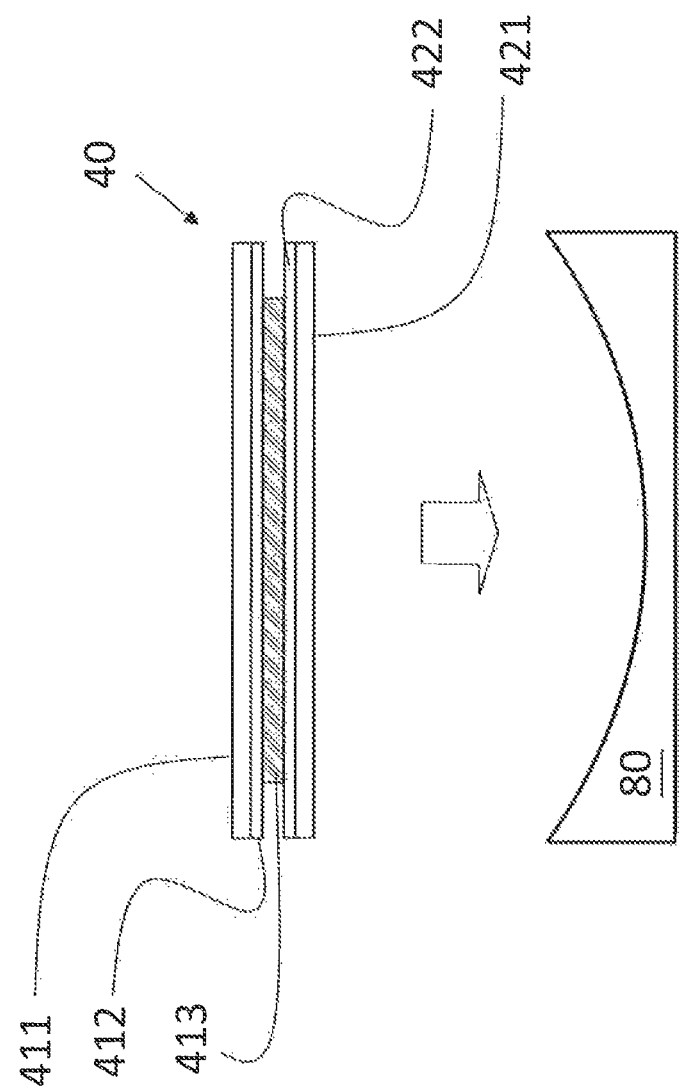

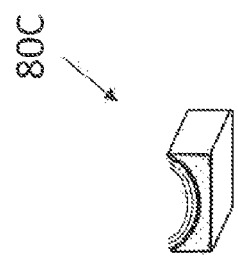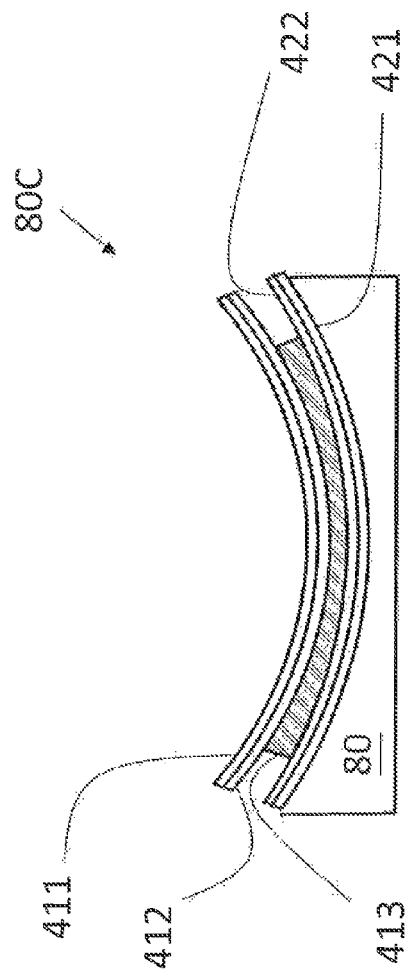

PRELOADED PRESSURE SENSOR MODULE

BACKGROUND

1. Technical Field

The present invention relates to a pressure sensor, especially to a preloaded pressure sensor module (PPSM) and its applications.

2. Description of Related Art

FIG. 1 shows a prior art flat piezoresistor device

FIG. 1 shows a flat piezoresistor device 10 which has a top substrate 111, a top electrode layer 112 configured under the top substrate 111, a top piezoresistive layer 113 configured under the top electrode layer 112; and a bottom substrate 121, a bottom electrode layer 122 configured on the bottom substrate 121, a bottom piezoresistive layer 123 configured on the bottom electrode layer 122. Further, a pair of spacers 114 is configured in between the top electrode layer 112 and the bottom electrode layer 122 such that a space 13 is formed in between the top piezoresistive layer 113 and the bottom piezoresistive layer 123. The top electrode layer 112 electrically couples to a first electrode, for example, positive (+) end of a control unit 15; and the bottom electrode layer 122 electrically couples to a second electrode, for example, negative (−) end of the control circuit 15.

FIG. 2 shows the flat piezoresistor device of FIG. 1 being pressed.

FIG. 2 shows that the center of the flat piezoresistor of FIG. 1 is pressed by a user. The circuit passes through the top electrode layer 112 and the bottom electrode layer 122 is closed when the top piezoresistive layer 113 touches the bottom piezoresistive layer 123. The signal is, however, unstable in the initial stage when the two piezoresistive layers 113, 123 touch each other due to initial unstable surface contact as illustrated in FIG. 3.

FIG. 3 shows the electrical characteristic for the prior art of FIG. 2

Y-axis shows output conductivity, X-axis shows the pressure force exerted against the flat piezoresistor device of FIG. 1. Line L1 shows the electrical characteristics for Output Conductivity versus Pressure. The output conductivity is zero during the pressure ranges between P00~P10, where the two piezoresistive layers 113, 123 are not in contact.

The output conductivity is unstable when the pressure force at a point ranges between P10 and P11. This is because of the unstable initial contact of the two piezoresistive layers 113 and 123. Line L1 shows linearity for pressure measurement at the points after P11 as the characteristic becomes adequate for application of pressure measurement. For a real case, a detection threshold DT is usually set on a point after P11, for example at P12 to assure measurement quality of the sensor. The pressure force at P12 is the minimum detectable limit for the flat pressure sensor 10. The pressure force at P12 is also known as an activation force for the sensor 10.

The disadvantage for the prior art flat pressure sensor of FIG. 1 is that the activation force can vary among the sensors in mass production. To produce the prior art sensor illustrated in FIG. 1, the manufacturer faces a tradeoff between detection limit and production yield, as aggressively setting a relatively lower detection limit responsive to a relatively lighter applied pressure may reduce production yield.

BRIEF DESCRIPTION OF THE DRAWINGS

FIG. 3 shows the electrical characteristic for the prior art of FIG. 2

FIG. 4A shows a piece of piezoresistive material.

FIG. 4B shows piezoresistive material of FIG. 4A being bent.

FIG. 5A shows a process to prepare a first PPSM according to the present invention.

FIG. 5B shows a perspective view of the base used in FIG. 5A

FIG. 6A shows a first PPSM according to the present invention.

FIG. 6B shows a perspective view of the PPSM of FIG. 6A.

FIG. 8 shows a comparison of the electrical characteristic between the present invention and the prior art.

FIG. 9 shows a process to prepare a second PPSM according to the present invention.

FIG. 10 shows a second PPSM prepared according to FIG. 9.

FIG. 11A shows a modified PPSM to the PPSM of FIG. 10.

FIG. 11B shows a further modified PPSM to the PPSM of FIG. 10.

FIG. 23A shows the third PPSM prepared according to FIG. 22.

FIG. 23B shows a perspective view of FIG. 23A.

FIG. 24 shows a process to prepare a fourth PPSM according to the present invention.

FIG. 25A shows a concave PPSM prepared according to FIG. 24.

FIG. 25B shows a perspective view of the concave PPSM of FIG. 25A.

DETAILED DESCRIPTION OF THE INVENTION

Figure 1:
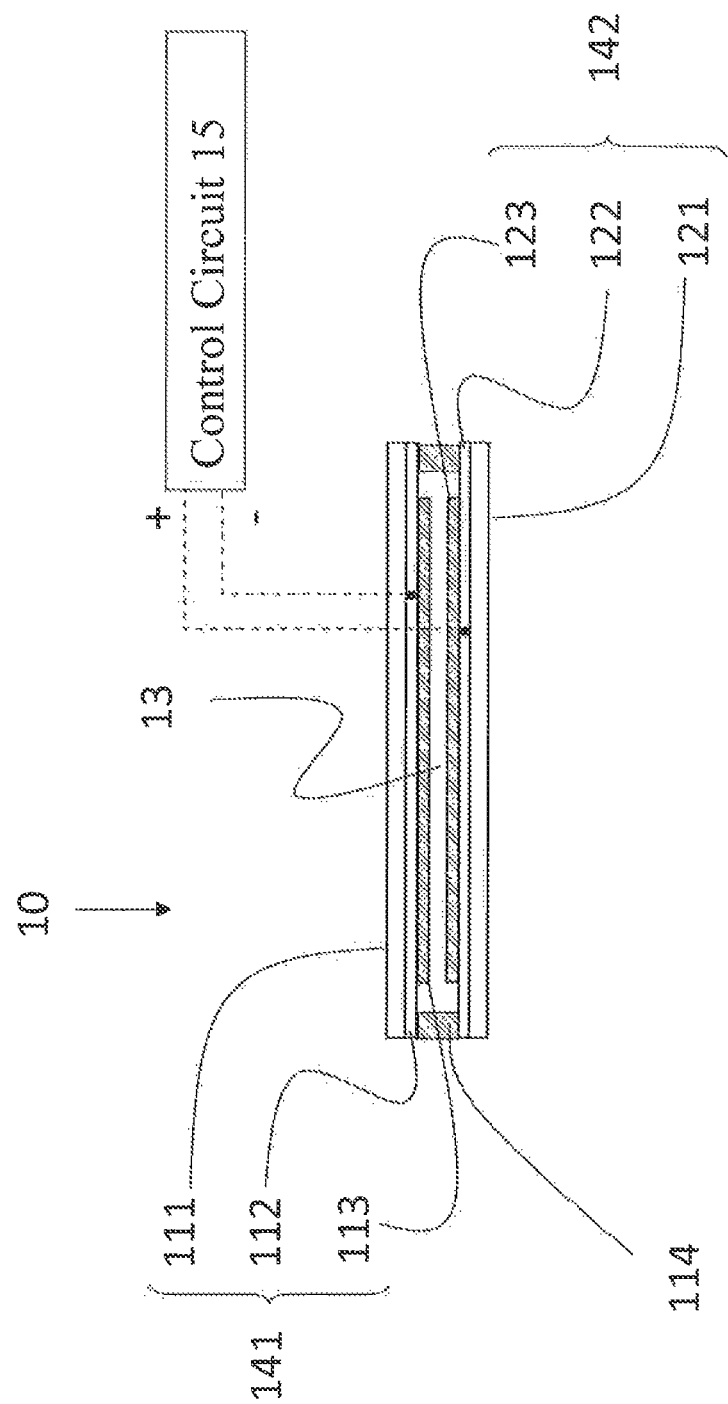
FIG. 1 shows a prior art flat piezoresistor device
Figure 2:
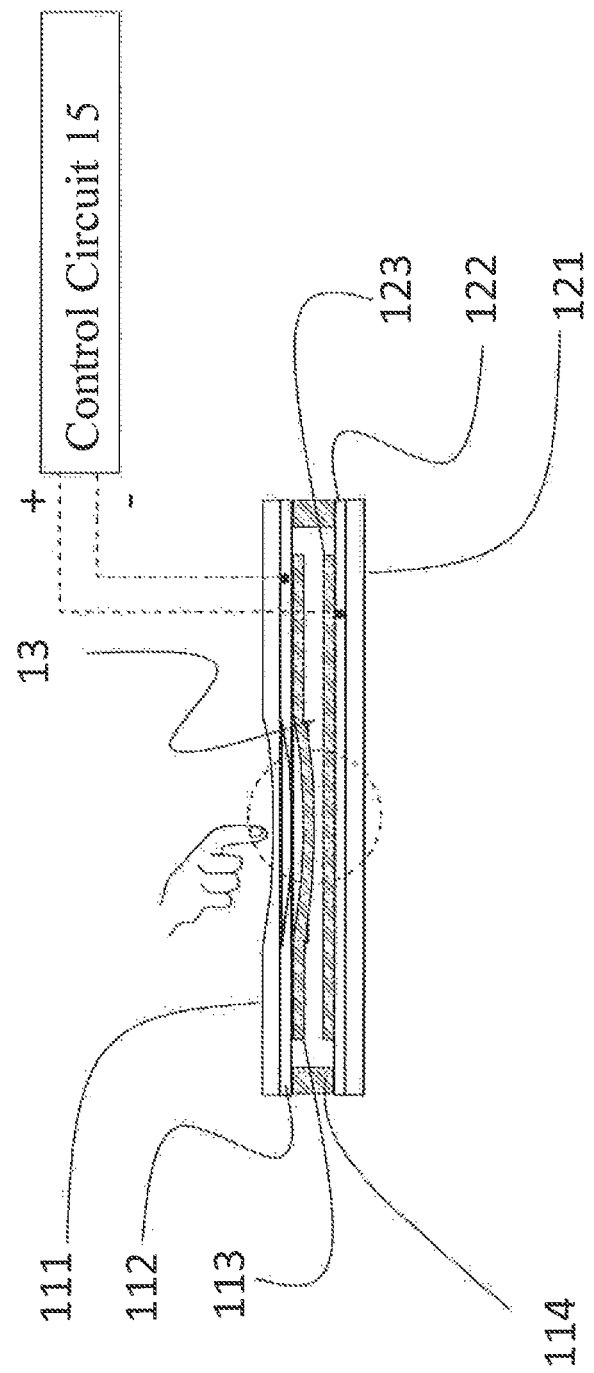
FIG. 2 shows the flat piezoresistor device of FIG. 1 being pressed.

This invention discloses a preloaded pressure sensor module (PPSM) which has a relatively lower detectable pressure limit. Multiple pressure levels can be set to trigger different functions.

FIG. 4A shows a piece of piezoresistive material.

FIG. 4A shows a piece of uncurved piezoresistive material PZ, which has an even thickness R1 with a first resistance in the vertical electrical path.

FIG. 4B shows piezoresistive material of FIG. 4A being bent.

FIG. 4B shows the piezoresistive material PZ of FIG. 4A is bent. The center portion of the curved piezoresistive material PZ is compressed to have a thinner thickness R2, and the bent area poses as a preloaded effect in contrast to the unbent piece of FIG. 4A. The compressed center of FIG. 4B shows a thinner thickness which has a second resistance R2 in a vertical electrical path, since R2 is smaller than R1. The thinner thickness shows a lesser resistance in vertical direction of the piezoresistive material PZ for a vertical electrical path. A lesser resistance means a higher electrical conductivity. The curved piezoresistive material PZ of FIG. 4B has a higher electrical conductivity in the center than the unbent one of FIG. 4A.

FIG. 5A shows a process to prepare a first PPSM according to the present invention.

FIG. 5A shows a flat piezoresistive device 10 is going to be mounted onto a base 30. The base 30 has a convex surface 301; the flat piezoresistive device 10 is configured on and bent along the convex surface 301 such that the flat piezoresistive device 10 is bent to form a convex sensor module 10B.

FIG. 5B shows a perspective view of the base used in FIG. 5A

FIG. 5B shows the base 30 can be one of an elongated convex block.

FIG. 6A shows a first PPSM according to the present invention.

FIG. 6A shows a PPSM prepared according to FIG. 5A, the flat piezoresistive sensor device 10 is configured on and bent along the curved surface 301 of the convex base 30 to form a first preloaded pressure sensor module (PPSM) 10B. The top piezoresistive layer 113 and the bottom piezoresistive layer 123 of the PPSM 10B touch at least in the center portion in the section view of FIG. 6A, and the piezoresistive layers 113, 123 are compressed in center portion. The PPSM 10B provides an advantage of a preloaded pressure sensor module having a lower minimum detectable limit.

FIG. 6B shows a perspective view of the PPSM of FIG. 6A.

Figure 7:
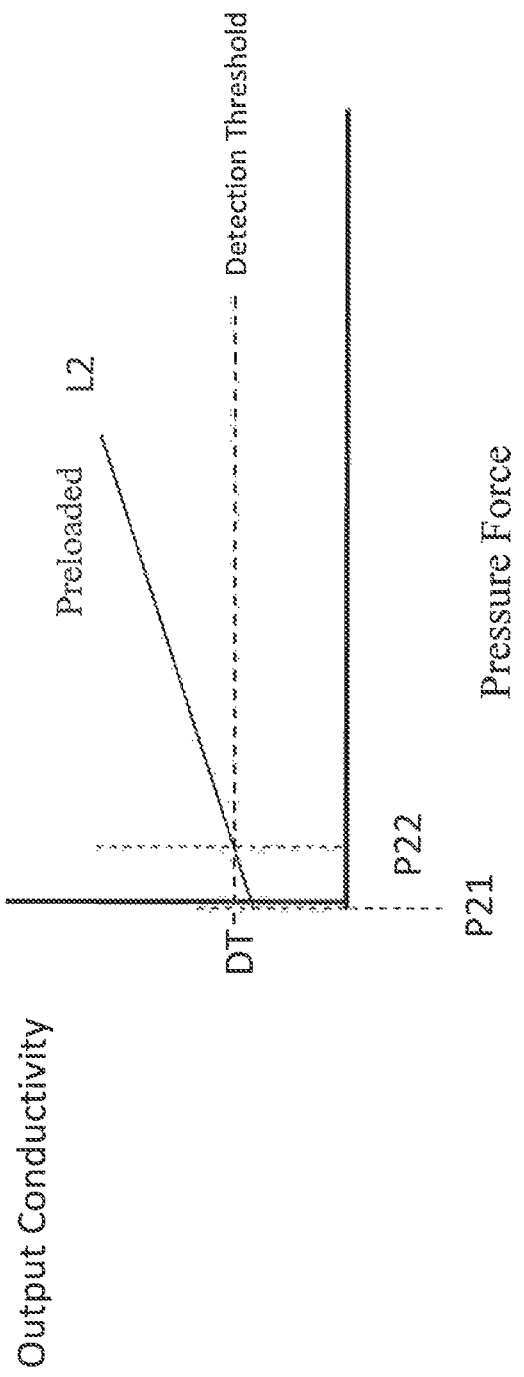
FIG. 7 shows the electrical characteristic of the first PPSM of FIG. 6A.

FIG. 7 shows the electrical characteristic of the first PPSM of FIG. 6A.

Line L2 shows an electrical characteristic for the PPSM of FIG. 6B. The Y-axis is Output Conductivity and the X-axis is Pressure. L2 shows a linear relationship for the Output Conductivity versus Pressure for the PPSM 10B of FIG. 6A or 6B. The initial portion between a pressure force at P21 and P22 is reserved and not to be used for measurement for quality assurance. Detection Threshold (DT) is set as shown in the figure, such that the pressure force at point P22 is the minimum detectable limit for the PPSM 10B.

FIG. 8 shows a comparison of the electrical characteristic between the present invention and the prior art.

Line L2 shows the electrical characteristic for PPSM 10B and line L1 shows that for a conventional one as disclosed in FIG. 1. The preloaded feature of PPSM 10B eliminates the initial unstable portion of the prior art sensor device, and which shifts the linear portion leftwards. A real test result for the comparison is shown in FIG. 8, the Detection Threshold DT is set at 1E-6/ohm to both the PPSM and the prior art device. Line L2 shows that the PPSM 10B can be triggered starting from only a 5 grams pressure, while the prior art sensor of FIG. 1 can be triggered from 20 grams as shown in line L1. The minimum activation force of 5 grams for the PPSM is significant lower than the 20 grams for the prior art of FIG. 1. The lesser activation three of PPSM 10B makes it suitable to be used as a function key. A plurality functions can be triggered depending on different output conductivity levels output from a PPSM 10B.

FIG. 9 shows a process to prepare a second PPSM according to the present invention.

FIG. 9 shows, firstly, preparing a piezoresistive sensor device 40 which has a stack of five layers of materials, sequentially from top to bottom, a top substrate 411, a top electrode layer 412, a single piece of piezoresistive material 413, a bottom electrode layer 422 and a bottom substrate 421; secondly, preparing a base 30, the base 30 has a convex surface 301 on top and flat on bottom; and thirdly, configuring the piezoresistive sensor 40 onto the surface 301 of the base 30. The piezoresistive sensor device 40 is bent and fixed on and along the curved surface 301 of the base 30.

FIG. 10 shows a second PPSM prepared according to FIG. 9.

FIG. 10 shows the second PPSM 40B comprises a stack top-down of a bent top substrate 411, a bent top electrode layer 412, a single piece of bent piezoresistive material 413, a bent bottom electrode layer 422, a bent bottom substrate 421, and a convex base 30. The center portion of the bent piezoresistive layer 413 is compressed in the section view.

FIG. 11A shows a modified PPSM to the PPSM of FIG. 10.

FIG. 11A shows a gap or an air space 431 is reserved in between the piezoresistive layer 413 and the bottom electrode layer 422. The electrical characteristic for the modified PPSM of FIG. 11A is similar to the one as shown in FIG. 7

FIG. 11B shows a further modified PPSM to the PPSM of FIG. 10.

FIG. 11B shows a gap or an air space 432 is reserved in between the piezoresistive layer 413 and the top electrode layer 412. The electrical characteristic for the modified PPSM of FIG. 11B is similar to the one as shown in FIG. 7.

Figure 12:
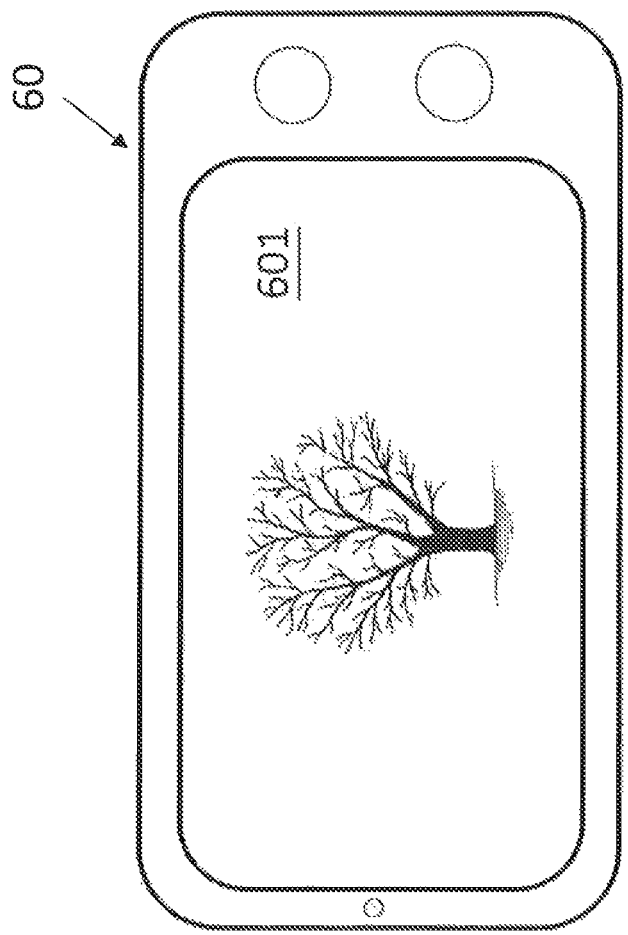
FIG. 12 shows a top view of a mobile electronic device.

FIG. 12 shows a top view of a mobile electronic device.

FIG. 12 shows a top view of a mobile electronic device such as a mobile phone, a portable media player, a tablet, or a personal digital assistant (PDA) . . . , etc. that has a cover glass 601 on top. With the PPSB 10B, 40B mounted under the cover glass 601, the cover glass 601 of the mobile electronic device poses a depressible function key.

Figure 13:
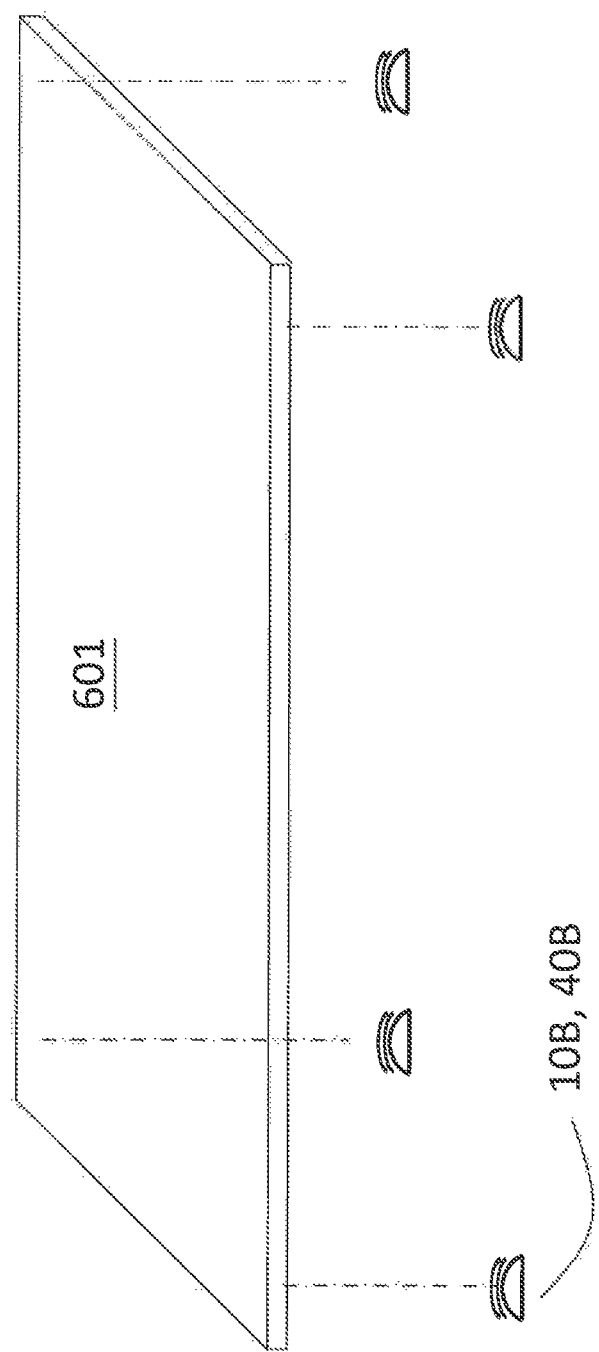
FIG. 13 shows a first application of the PPSM according to the present invention.

FIG. 13 shows a first application of the PPSM according to the present invention.

FIG. 13 shows four PPSMs 10B,40B is configured under the cover glass 601 of an electronic mobile device 60. Each of the PPSMs 10B, 409 is located at one of the four corners of the cover glass 601. Each of the PPSM 10B, 40B electrically couples to a control unit for triggering functions of the mobile electronic device 60. The PPSM 10B, 40B senses the pressure force applied on the cover glass 601 by a user and transmits a corresponding signal to the control unit when the cover glass 601 is pressed.

Figure 14:
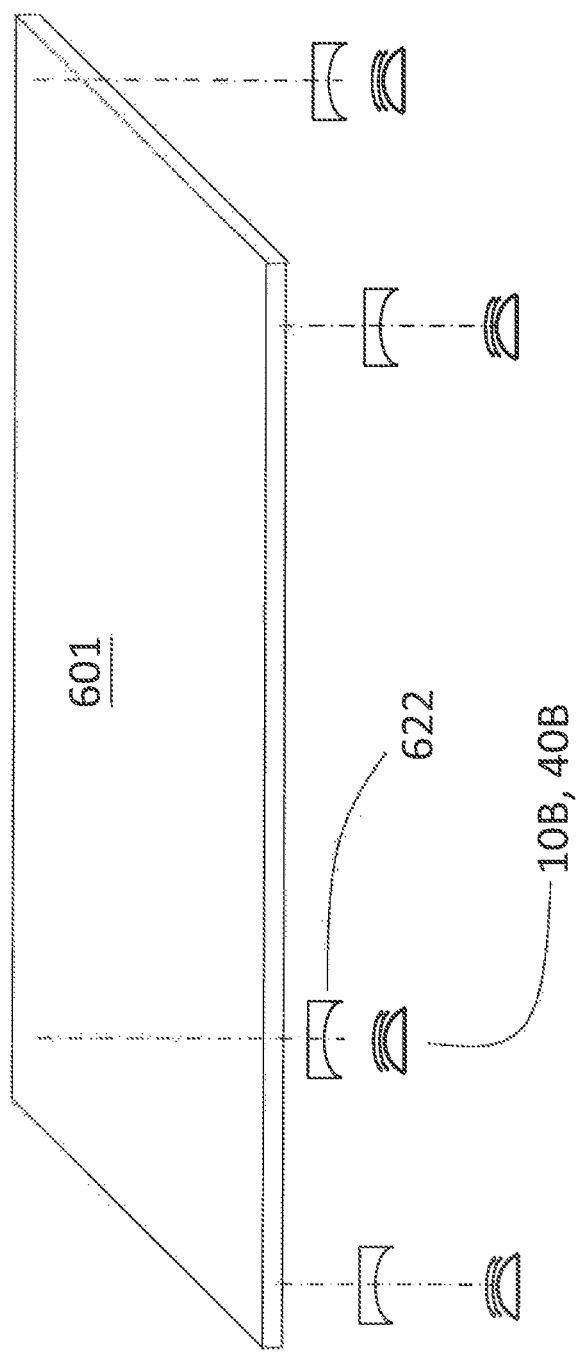
FIG. 14 shows a second application embodiment of the PPSM according to the present invention.

FIG. 14 shows a second application embodiment of the PPSM according to the present invention.

FIG. 14 shows four pieces of concave bump 622 which can be one made of rubber or plastic is provided and each is inserted in between the cover glass 601 and one of the PPSMs 10B,40B as an interface complementary material there between.

Figure 15:
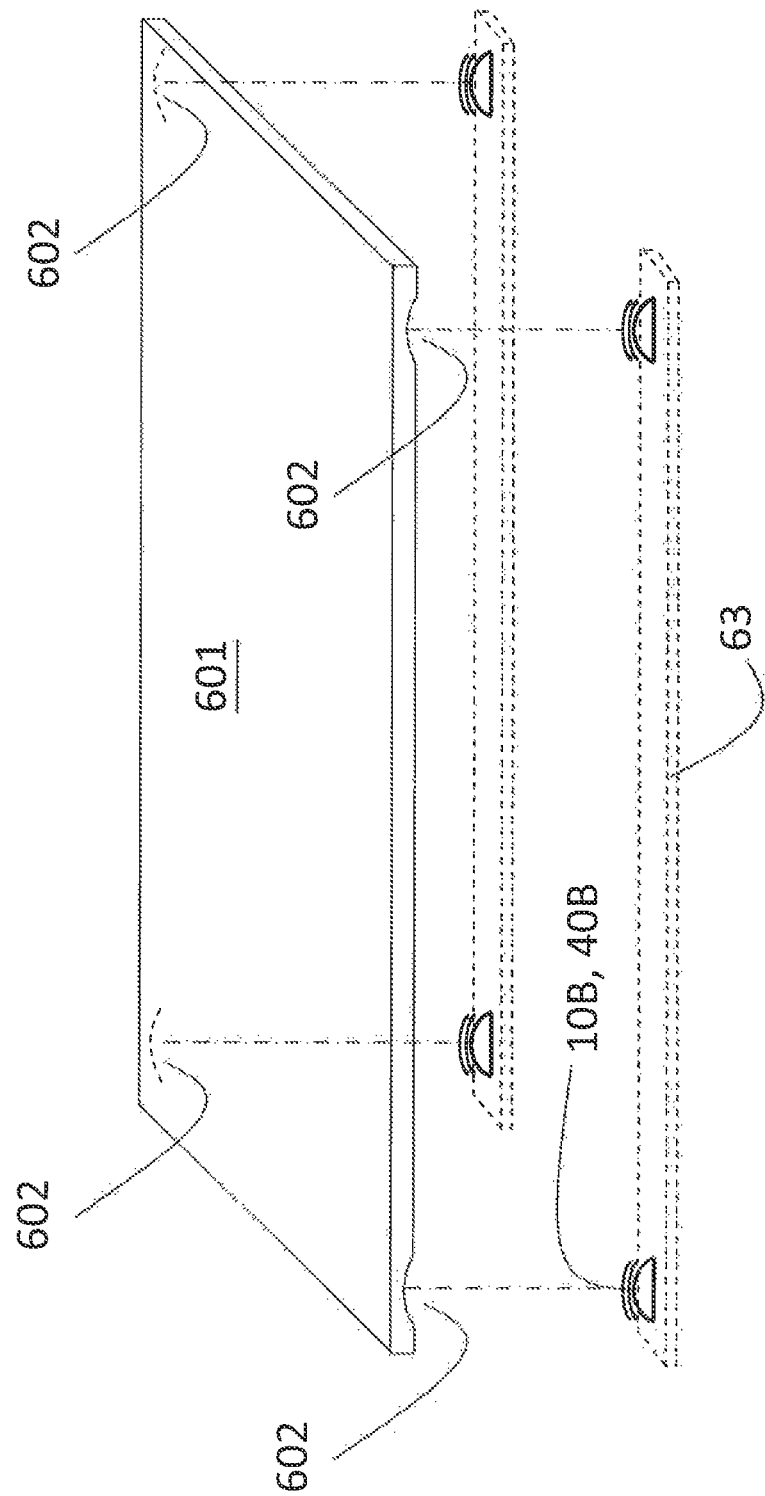
FIG. 15 shows a third application of the PPSM according to the present

FIG. 15 shows a third application of the PPSM according to the present invention.

FIG. 15 shows four concave indentations 602 made on bottom surface of the cover glass 601; each of the concave indentations matches one of the PPSMs 10B, 40B underside.

Figure 16:
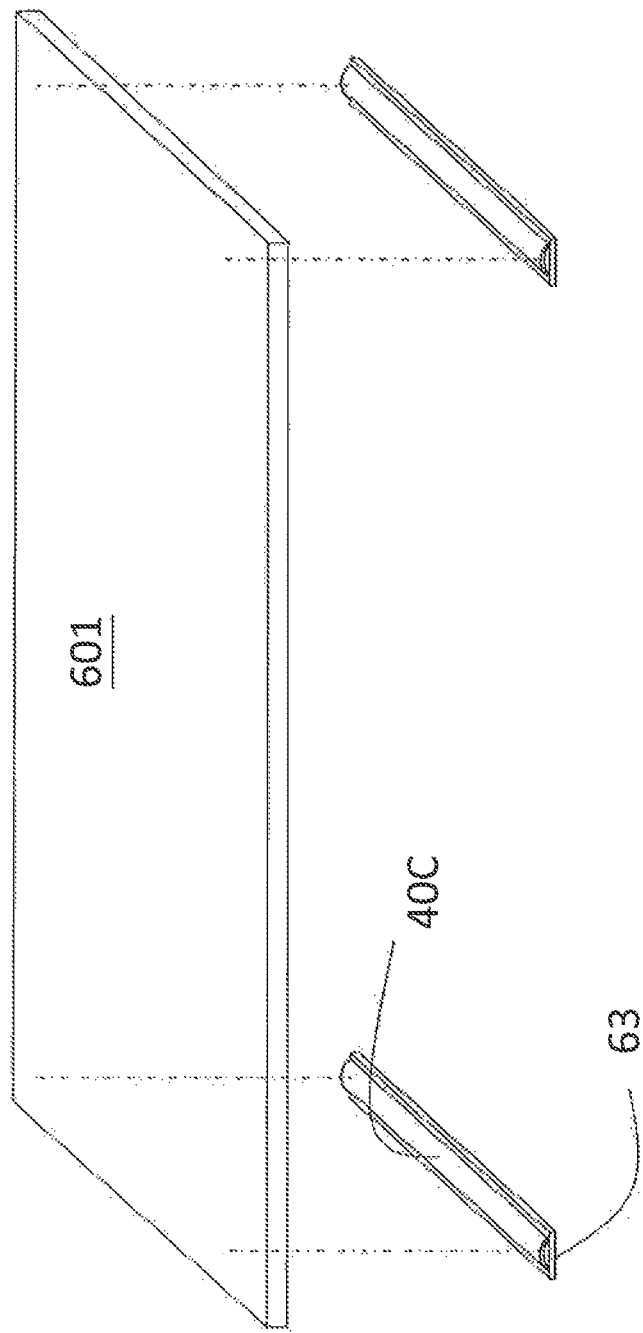
FIG. 16 shows a fourth application of the PPSM according to the present invention.

FIG. 16 shows a fourth application of the PPSM according to the present invention.

FIG. 16 shows a first strip of the PPSM 40C is configured on the left side under the cover glass 601, and a second strip of the PPSM 40C is configured on the right side under the cover glass 601. Each of the PPSMs 40C is configured on a piece of frame 63 of the mobile electronic device 60. An alternative is that the first strip of the PPSM is configured on the top side under the cover glass 601, and the second strip of the PPSM is configure of bottom side under the cover glass 601.

Figure 17:
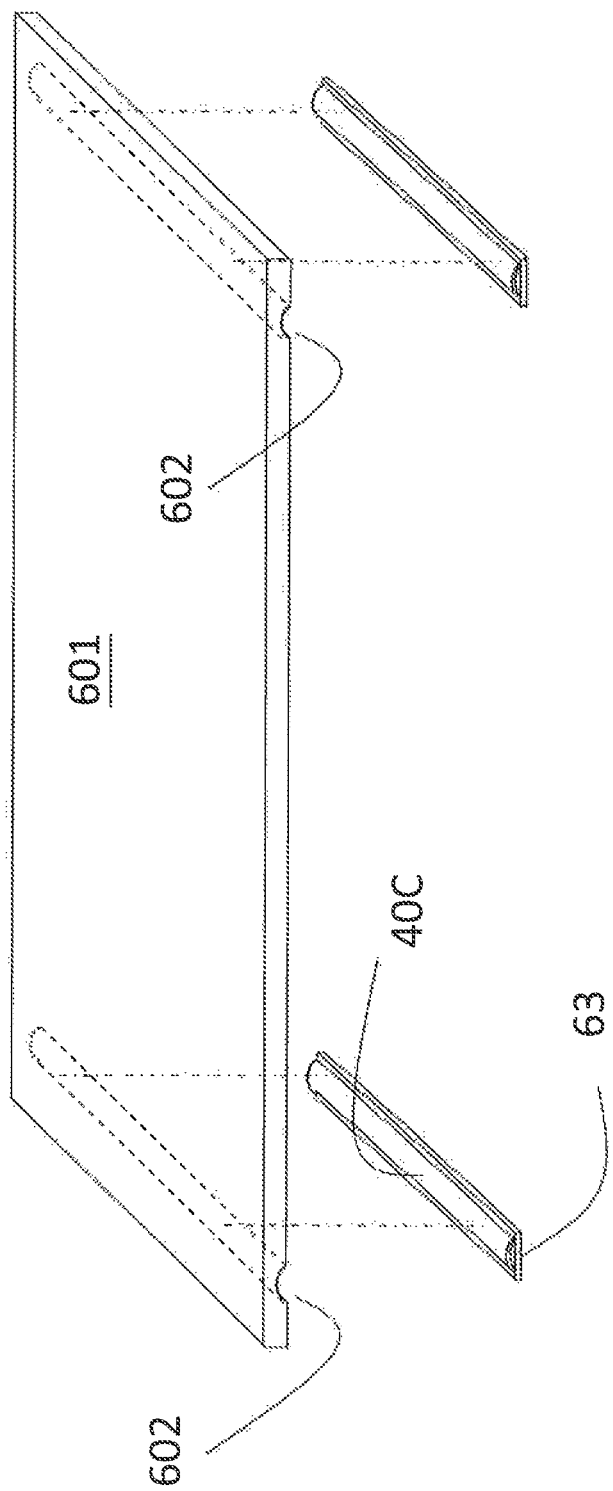
FIG. 17 shows a fifth application of the PPSM according to the present invention.

FIG. 17 shows a fifth application of the PPSM according to the present invention.

FIG. 17 shows a first concave indentation 602, made on the bottom surface of the cover glass 601 for matching the first strip of the convex PPSM 40C, and a second concave indentation 602, made on the bottom surface of the cover glass 601 for matching the second strip of convex PPSM 40C.

Figure 18:
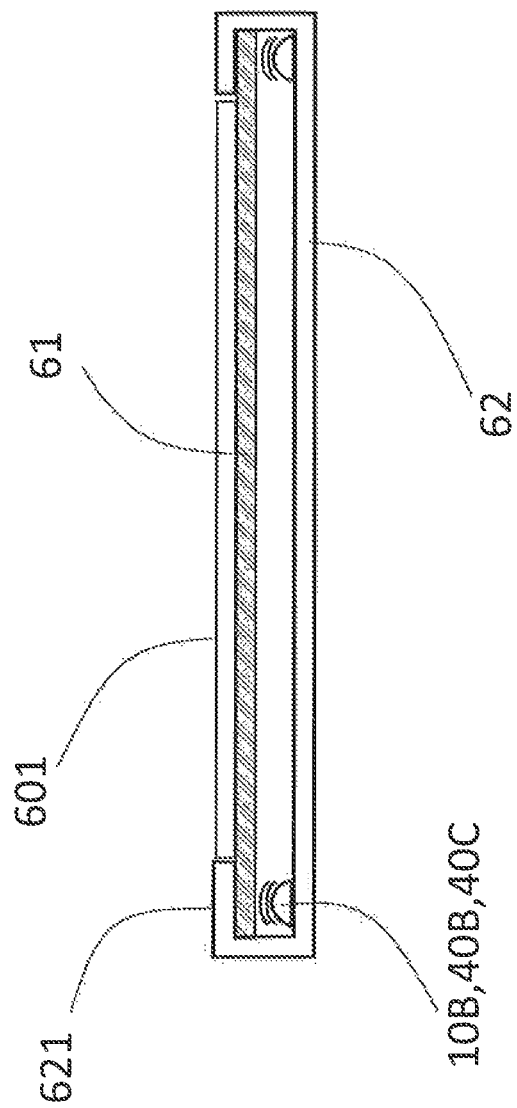
FIG. 18 shows a sixth application of the PPSM according to the present invention.

FIG. 18 shows a sixth application of the PPSM according to the present invention.

FIG. 18 shows a display module 61 is configured under a cover glass 601 within a housing frame 62 of a mobile electronic device 60; and two PPSMs 10B,40B,40C are configured under the display module 61 in the section view. The PPSMs 10B,40B,40C senses forces pressed by a user against the cover glass 601 of the mobile electronic device 60.

Figure 19:
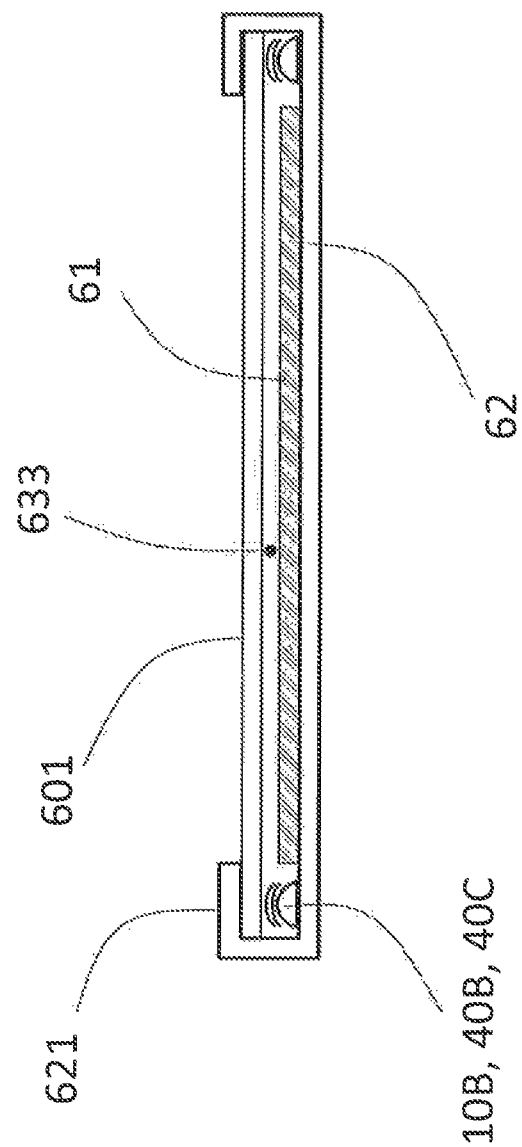
FIG. 19 shows a seventh application of the PPSM according to the present invention.

FIG. 19 shows a seventh application of the PPSM according to the present invention.

FIG. 19 shows a portable electronic device having a cover glass 601, a display module 61 configured under the cover glass 601, a space 633 reserved between the cover glass 601 and the display module 61; and two PPSMs 10B,40B,40C, one configured on the left side under the cover glass 601 in a section view, and the other one configured on the right side under the cover glass 601 in a section view. The display module 61 is configured in between the two PPSMs 10B,40B, 40C in a section view. The PPSM senses pressure forces pressed by a user against to the cover glass 601 of the mobile electronic device 60.

Figure 20:
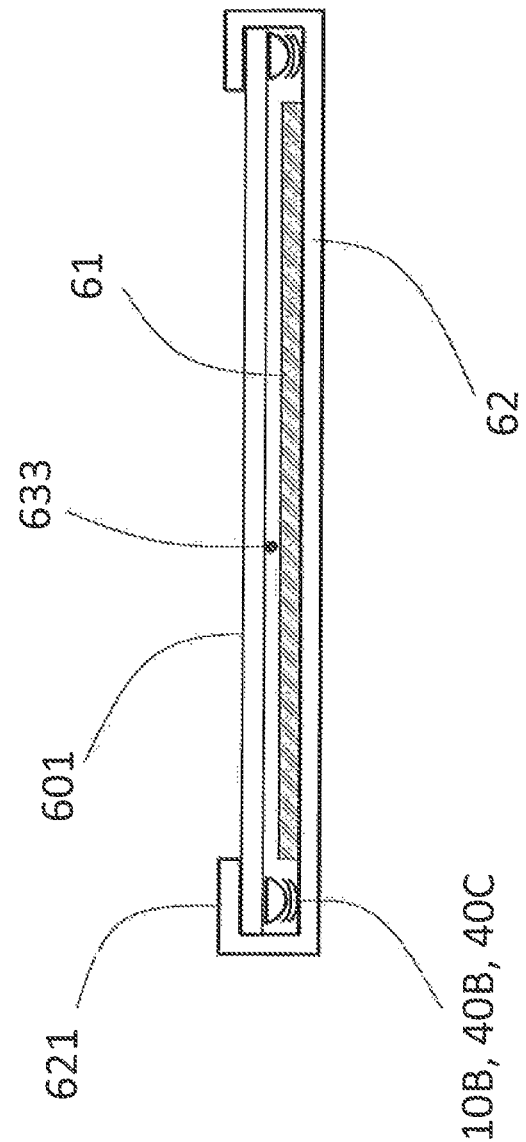
FIG. 20 shows an eighth application of the PPSM according to the present

FIG. 20 shows an eighth application of the PPSM according to the present

FIG. 20 is similar to FIG. 19 only that the two PPSMs 10B,40B,40C, are upside down configured in the section view.

Figure 21:
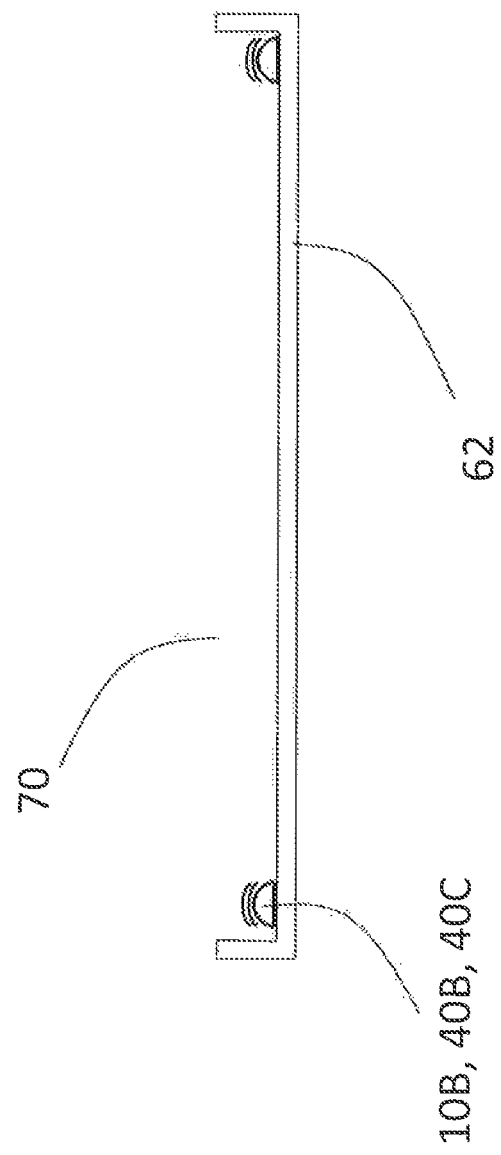
FIG. 21 shows a ninth application of the PPSM according to the present invention.

FIG. 21 shows a ninth application of the PPSM according to the present invention.

FIG. 21 shows a mobile electronic device having a U shaped frame 62, a compound display module 70 configured in the open top area of the frame 62, the compound display module 70 has touch sensors integrated inside; a first PPSM 10B,40B,40C configured under the module 70 in the left side, and a second PPSM 10B,40B, 40C configured under the module 70 in the right side in the section view of FIG. 20. The PPSM senses pressure forces pressed by a user against the module 70 of the mobile electronic device 60.

Figure 22:
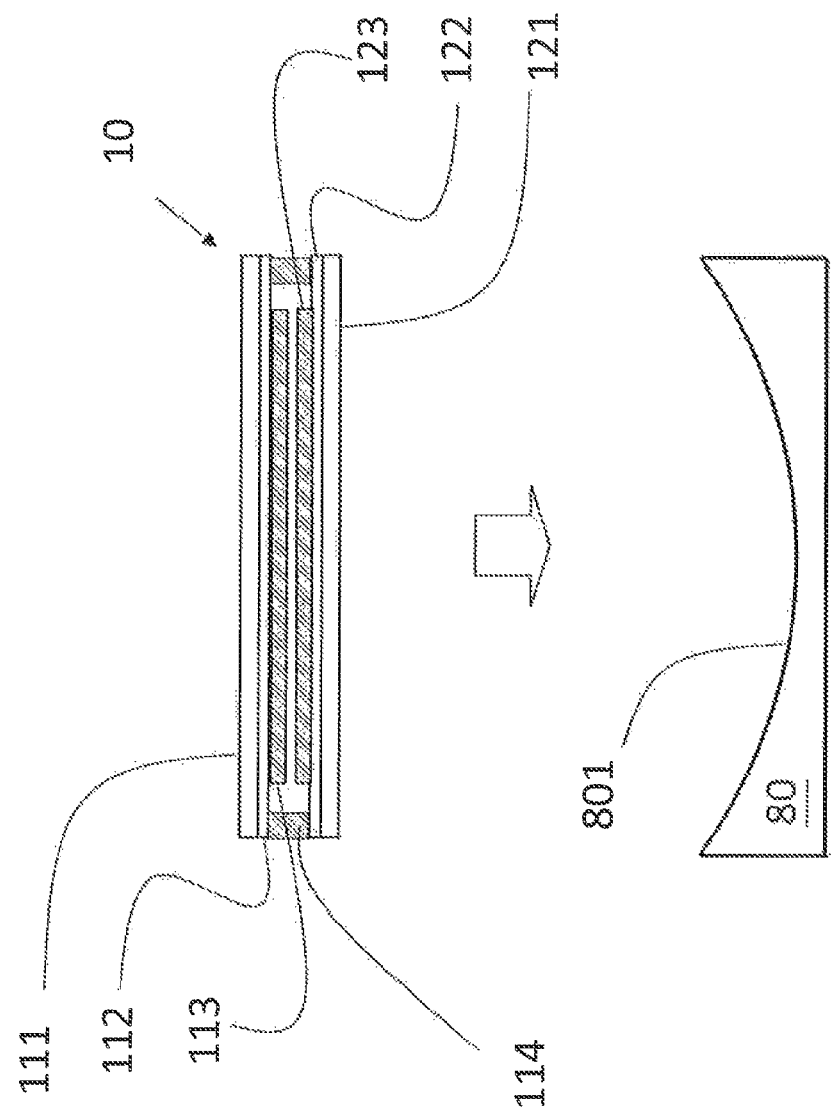
FIG. 22 shows a process to prepare a third PPSM according to the present invention.

FIG. 22 shows a process to prepare a third PPSM according to the present invention.

FIG. 22 shows a flat piezoresistive sensor device 10 is prepared, and then the flat piezoresistive sensor device 10 is pressed and mounted onto a concave base 80, the base 80 has a concave surface 801. The flat piezoresistive sensor device 10 is bent and attached onto the base 80 along the profile of the curved surface 801.

FIG. 23A shows the third PPSM prepared according to 801.

FIG. 23A shows a concave PPSM consisting of a piezoresistive sensor device configured on and along the concave surface 801 such that the piezoresistive sensor device is bent to form a concave PPSM 80B.

FIG. 23B shows a perspective view of the PPSM of FIG. 23A.

FIG. 24 shows a process to prepare a fourth PPSM according to the present invention.

FIG. 24 shows, firstly, preparing a flat pressure sensor 40 which has a stack of five layers of materials, sequentially from top to bottom, a top substrate 411, a top electrode layer 412, a single piece of piezoresistive material 413, a bottom electrode layer 422 and a bottom substrate 421; secondly, preparing a base 80, the base 30 has a concave surface 801 on top and flat on bottom; and thirdly, configuring the pressure sensor 40 onto the surface of the base 30. The pressure sensor 40 is bent and attached onto the base 80 along the profile of the curved surface 801 to form a concave PPSM 80C.

FIG. 25A shows a concave PPSM prepared according to FIG. 24.

FIG. 25B shows a perspective view of the concave PPSM of FIG. 25A.

Figure 26:
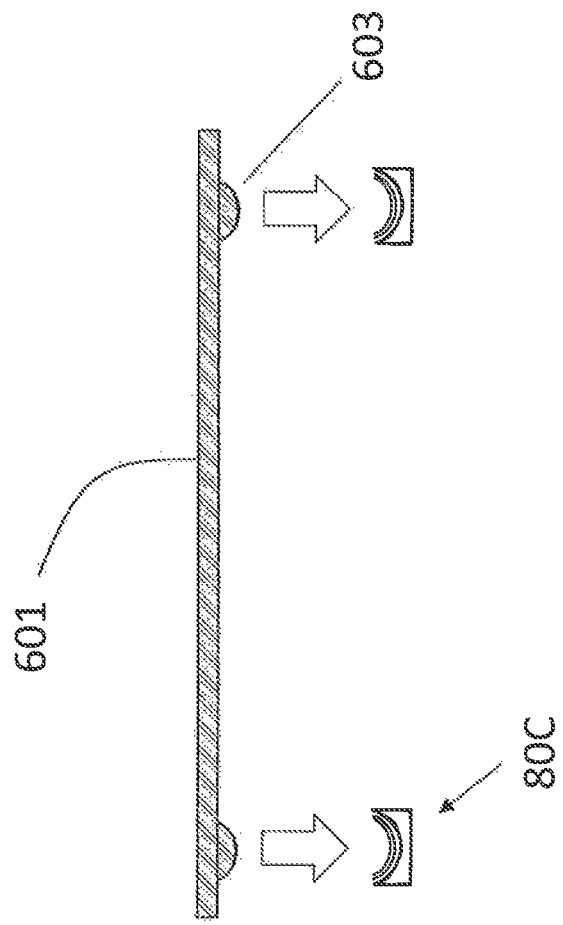
FIG. 26 shows a tenth application equipped with a concave PPSM according to the present invention.

FIG. 26 shows a tenth application equipped with a concave PPSM according to the present invention.

FIG. 26 shows a cover glass 601 of a mobile electronic device 60, a first convex bump 603 configured under the cover glass 601 on the left side; a second convex bump 603 configured under the cover glass 601 on the right side; a first concave PPSM 80C configured under the first convex bump 603; and a second concave PPSM 80C configured under the second convex bump 603. Each of the concave PPSMs 80C electrically couples to a control unit to sense a force pressed by a user against the cover glass 601 for trigging a predetermined function.

Figure 27:
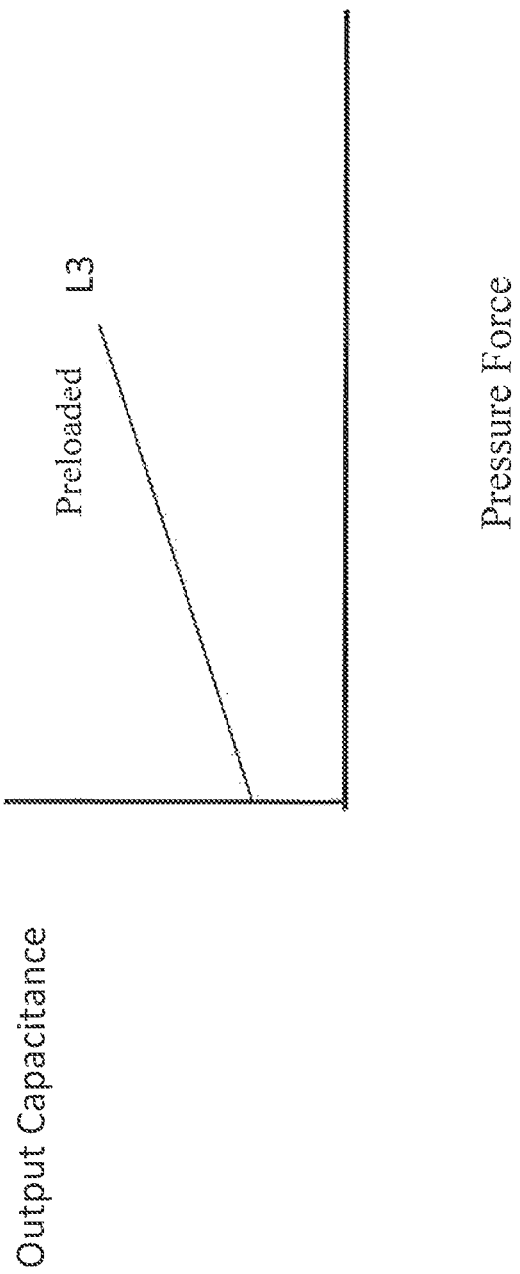
FIG. 27 shows a second electrical characteristic for the PPSM according to the present invention.

FIG. 27 shows a second electrical characteristic for the PPSM according to the present invention.

FIG. 27 shows linear relationship for "Output Capacitance vs. Pressure" for the PPSM as disclosed in this invention. The output capacitance can also be used to trigger different functions with different output capacitance level. Referring to FIG. 6A, the top electrode layer 112, the top piezoresistive layer 113, the bottom piezoresistive layer 123, and the bottom electrode layer 122 are akin to a capacitor where the two piezoresistive layers 113, 123 could be replaced by dielectric layers to be sandwiched in between the two electrode layers 112,122. The pressure-sensitive capacitor in a state described for the PPSM 10B (FIG. 6A) can also be applied to the remaining PPSM as disclosed in this invention such as PPSM 40B (FIG. 10), the PPSM of FIGS. 11A, 11B, and the PPSM 40C of FIG. 16.

While several embodiments have been described by way of example, it will be apparent to those skilled in the art that various modifications may be made without departing from the spirit of the present invention. Such modifications are all within the scope of the present invention, as defined by the appended claims.

What is claimed is:

1. A preloaded pressure sensor module, comprising:
   a substrate, having a curved surface; and
   a pressure sensor, configured on and along the curved surface such that said pressure sensor has a profile in conformance to the profile of said curved surface.

2. A preloaded pressure sensor module as claimed in claim 1, wherein said pressure sensor further comprising:
   a top pressure sensitive layer; and
   a bottom pressure sensitive layer, configured under the top pressure sensitive layer; wherein a bottom center of said top pressure sensitive layer contacts a top center of said bottom pressure sensitive layer.

3. A preloaded pressure sensor module as claimed in claim 2, wherein
   both said pressure sensitive layer are bent to form an arc in a section view.
4. A preloaded pressure sensor module as claimed in claim 3, wherein
   said arc is selected from a group consisted of a convex and a concave.
5. A preloaded pressure sensor module as claimed in claim 4, wherein
   one of said pressure sensitive layer is a piezoresistive or dielectric material.
6. A preloaded pressure sensor module as claimed in claim 5, further comprising:
   a top electrode, configured on the top pressure sensitive layer; and
   a bottom electrode, configured under the bottom pressure-sensitive layer.
7. A preloaded pressure sensor module as claimed in claim 6, further comprising:
   a top substrate, configured on the top electrode; and
   a bottom substrate, configured under the bottom electrode.
8. A preloaded pressure sensor module as claimed in claim 1, wherein
   said curved surface is selected from a group consisted of a convex surface and a concave surface.
9. A preloaded pressure sensor module as claimed in claim 1, wherein said pressure sensor further comprising:
   a top electrode;
   a bottom electrode; and
   a single piece of pressure sensitive layer, configured in between the top electrode and the bottom electrode.
10. A preloaded pressure sensor module as claimed in claim 9, wherein
    said pressure sensitive layer is selected from a group consisted of piezoresistive material and dielectric material.
11. A preloaded pressure sensor module as claimed in claim 9, further comprising:
    an air space in between the pressure sensitive layer and the top electrode.
12. A preloaded pressure sensor module as claimed in claim 9, further comprising:
    an air space in between the pressure sensitive layer and the bottom electrode.
13. A preloaded pressure sensor module as claimed in claim 9, further comprising:
    a top substrate, configured on the top electrode; and
    a bottom substrate, configured under the bottom electrode.
14. A preloaded pressure sensor module as claimed in claim 9, wherein
    said curved surface is selected from a group consisted of a convex and a concave.
15. A preloaded pressure sensor module as claimed in claim 1, wherein
    said pressure sensor is selected from a group consisted of piezoresistive sensor and capacitor sensor.
16. A portable electronic device, comprising:
    a cover glass; and
    a preloaded pressure sensor module of claim 1, configured under the cover glass.
17. A portable electronic device as claimed in claim 16, wherein
    said preloaded pressure sensor module has a convex top; and
    four said convex preloaded pressure sensor modules are used; each is configured under one of four corners of said cover glass with said convex top contacting said cover glass.
18. A portable electronic device as claimed in claim 17, further comprising
    a concave bump, configured in between the cover glass and one of the convex preloaded pressure sensor modules.
19. A portable electronic device as claimed in claim 17, further comprising
    a concave indentation, made on bottom surface of said cover glass; matching with one of said preloaded pressure sensor modules underside.
20. A portable electronic device as claimed in claim 16, wherein
    said preloaded pressure sensor module has a convex top;
    a first strip of said preloaded pressure sensor module, configured on a first side under the cover glass with said convex top contacting said cover glass; and
    a second strip of said preloaded pressure sensor module, configured on a second side opposite to the first side under the cover glass with said convex top contacting said cover glass.
21. A portable electronic device as claimed in claim 20, wherein
    said first side and second side are top side and bottom side respectively.
22. A portable electronic device as claimed in claim 20, wherein
    said first side and second side are left side and right side respectively.
23. A portable electronic device as claimed in claim 20, further comprising:
    a first concave indentation, made on the bottom surface of said cover glass for matching with said first strip of convex preloaded pressure sensor module; and
    a second concave indentation, made on the bottom surface of said cover glass for matching with said second strip of preloaded pressure sensor module.
24. A portable electronic device as claimed in claim 16, wherein
    said preloaded pressure sensor module has a convex top and a flat bottom; and
    one said convex preloaded pressure sensor module is configured under said cover glass with said flat bottom contacting said cover glass.
25. A portable electronic device, comprising:
    a display module; and
    a preloaded pressure sensor module of claim 1, configured under the display module.
26. A portable electronic device, comprising:
    a cover glass;
    a space, configured under the cover glass;
    a display module, configured under the space; and
    two preloaded pressure sensor modules, one configured on a first side under said cover glass, and the other one configured on a second side under said cover glass; wherein
    said display module is configured in between said two preloaded pressure sensor modules in a section view.
27. A portable electronic device, comprising:
    a display module with an integrated touch sensor; and
    a preloaded pressure sensor module of claim 1, configured under the display module.

28. A portable electronic device, comprising:
a cover glass, having a bottom bump; and
a sensor module of claim 5, configured under the bump; wherein said bump has a bottom profile in conformance to the top profile of the preloaded pressure sensor.

29. A portable electronic device, comprising:
a cover glass, having a bottom bump; and
a sensor module of claim 11, configured under the bump; wherein said bump has a bottom profile in conformance to the top profile of the preloaded pressure sensor.

30. A process for preparing a preloaded pressure sensor module, comprising:
preparing a substrate with a curved surface;
preparing a pressure sensor; and
configuring said pressure sensor onto said curved surface.

31. A process for preparing a preloaded pressure sensor module as claimed in claim 29, wherein
said curved surface is selected from a group consisted of a convex and a concave.

* * * * *